United States Patent [19]

Sitabkhan

[11] 4,143,545
[45] Mar. 13, 1979

[54] PRESSURE GAUGE ASSEMBLY

[75] Inventor: Abdul N. Sitabkhan, Arcadia, Calif.

[73] Assignee: HTL Industries, Inc., Pasadena, Calif.

[21] Appl. No.: 866,371

[22] Filed: Jan. 3, 1978

[51] Int. Cl.$^2$ .......................... B60C 23/04; G01L 7/04
[52] U.S. Cl. ..................................... 73/146.8; 73/708; 73/736; 73/741; 137/227
[58] Field of Search ........... 73/742, 743, 741, DIG. 5, 73/708, 146.8; 137/227

[56] References Cited

U.S. PATENT DOCUMENTS

| | | | |
|---|---|---|---|
| 1,855,088 | 4/1932 | Boenker et al. | 73/742 |
| 3,338,101 | 8/1967 | Krasnitz | 73/742 |
| 3,728,899 | 4/1973 | Dijkema | 73/708 |
| 3,807,232 | 4/1974 | Wetterhorn | 73/742 |
| 3,905,237 | 9/1975 | Smalarz et al. | 73/708 |
| 3,946,175 | 3/1976 | Sitabkhan | 200/83 L |
| 3,969,936 | 7/1976 | Lindsay | 73/146.8 |

*Primary Examiner*—Donald O. Woodiel
*Attorney, Agent, or Firm*—Harold L. Jackson; Stanley R. Jones; Joseph W. Price

[57] ABSTRACT

A pressure gauge assembly for aircraft tires and the like having a helical coil bourdon tube sensor capable of indicating a pressure differential between a monitored source of pressure and a calibrated reference source of pressure. The reference pressure is applied to one surface of the bourdon tube coils while the monitored pressure is applied to the other surface of the coils. The resultant movement is a linear indication of any pressure differential. A valve assembly can be provided with the pressure gauge assembly to permit fluidic access to the monitored pressure. If the volume of the monitored pressure is variable such as an aircraft tire, the secondary source of calibrated pressure can be provided with a predetermined pressure relative to the normal tire pressure to compensate for any volumetric changes in the tire during operation. In an alternative embodiment, the bourdon tube can be used to monitor the pressure in a fire extinguisher for indicating any leaks. Advantageously, dials are provided for a visual inspection to determine a go or no-go situation. Finally, the pressure gauge can be temperature compensated by providing the calibrated pressure source with a fluid having substantially the same pressure temperature response characteristics as the fluid in the monitored pressure chamber.

30 Claims, 4 Drawing Figures

PRESSURE GAUGE ASSEMBLY

BACKGROUND OF THE INVENTION

1. Field of the Invention

The present invention is directed to apparatus for measuring leakage of fluids from a closed container and more particularly to a pressure indicator utilizing a helical bourdon tube sensing element for monitoring the pressure in aircraft tires and the like.

2. Description of the Prior Art

It is well known in the aircraft industry, that the aircraft tire pressure is extremely important and must be maintained within a limited range. For example, the tire pressure for a DC-10 should be between 170 and 185 psi at 68° F. and atmospheric pressure. As can be readily appreciated, a tire in a modern jet aircraft is subject to extreme variations in ambient pressure and temperature during normal usage. Additionally, the tire itself is subject to extreme force loadings during a landing and an underinflated tire can cause a blow out and even a serious crash.

The high cost of capital equipment in the aircraft industry requires the maximum utilization of a plane. This utilization, however, must be balanced against safety requirements which frequently provide opposing criteria to be met. Thus, while it is desirable to permit ground crews to monitor various equipment and components of an aircraft prior to a takeoff, it is also highly desirable to simplify this procedure and to permit it to be conducted at the lowest possible human fail rate and with the most expedient and simplest visual checks. Besides aircraft tires, fire extinguisher containers on a modern aircraft should frequently be checked to be sure that they have not been rendered useless as a result of a leak. These fire extinguisher units in aircraft assemblies can experience relatively high pressures of 3,000 psia or greater and sudden temperature changes of several hundred degrees Fahrenheit which makes it difficult to accurately determine the condition of the unit.

One particular leakage indicator for fire extinguishers is shown in U.S. Pat. No. 3,735,376 issued on May 22, 1973 and assigned to the assignee of the present application. The device of U.S. Pat. No. 3,735,376 provides a temperature compensated alarm mechanism for a fire extinguisher suitable for use on aircraft or other vehicles. The mechanism included, in addition to the main pressure container, a miniaturized container which was inserted into the main chamber and was effectively separated by a diaphragm between the two containers. The diaphragm was responsive to a predetermined drop in pressure of the main container to produce a signal indicative that the fire extinguisher was leaking. Since both the miniature container and the main container were filled with fluids having similar pressure temperature responses, the device was essentially temperature independent.

Another temperature compensated pressure indicator is disclosed in U.S. Pat. No. 3,946,175 issued Mar. 23, 1976, and assigned to the assignee of the present application. In this apparatus, a bellows member formed of welded metal rings was sealed in the indicator housing between the primary and secondary pressure chambers and was capable of indicating any differential pressure.

Patents of general interest are U.S. Pat. No. 3,905,237, U.S. Pat. No. 3,163,046 and U.S. Pat. No. 3,990,309.

There is still a demand in the prior art to provide a relatively simple and economical pressure gauge assembly that is capable of providing a visual indication of leaks in a monitored pressure chamber such as fire extinguisher assemblies. Additionally, the monitoring of pressure of aircraft tires in a quick and efficient manner is a requirement that has not to date been satisfied by the prior art.

SUMMARY OF THE INVENTION

The present invention provides a pressure indicator assembly that is capable of being attached to a monitored pressure chamber to determine any leakage. Sensor means is provided for sensing a pressure differential between the pressurized fluid in the monitored chamber and a calibrated secondary source of reference pressure. Advantageously, the sensor means includes a helical coil bourdon tube that is operatively in fluidic contact with both the monitored pressure chamber and the calibrated reference source. Thus, the relative pressure differential that exists between the interior and exterior surfaces of the bourdon tube sensing elements is capable of generating an output movement of the coils susceptible of providing an output representative signal of the fluid leakage.

An indicator output means that is responsive to the sensor means provides the output representation of the pressure differential between the secondary source of pressure and the monitored pressure chamber and can include either an output indicator dial and/or remote indicator. A first magnet member mounted and sealed within the gauge housing can generate a magnetic field that will influence a second magnetic member exterior of the gauge housing for positioning a dial pointer. Means can be provided for compensating for any volumetric changes in the monitored pressure chamber during normal operation. The means for compensation is of particular importance in monitoring aircraft tires that have a modulus of elasticity which is variable with temperature and can influence the actual volume of pressurized fluid such as nitrogen that is being measured. By selectively underpressurizing the secondary reference chamber at a predetermined level, it is capable of compensating for any volumetric changes in the tire during normal operation.

The features of the present invention which are believed to be novel are set forth with particularity in the appended claims. The present invention, both as to its organization and manner of operation, together with further objects and advantages thereof, may best be understood by reference to the following description, taken in conjunction with the accompanying drawings.

DESCRIPTION OF THE PREFERRED EMBODIMENT

The following description is provided to enable any person skilled in the aircraft industry to make and use the invention and sets forth the best modes contemplated by the inventor of carrying out his invention. Various modifications, however, will remain readily apparent to those skilled in the arts since the generic principles of the present invention have been defined herein specifically to provide a relatively easily manufactured pressure indicator assembly for use on aircraft tires and fire extinguisher assemblies.

Figure 1:
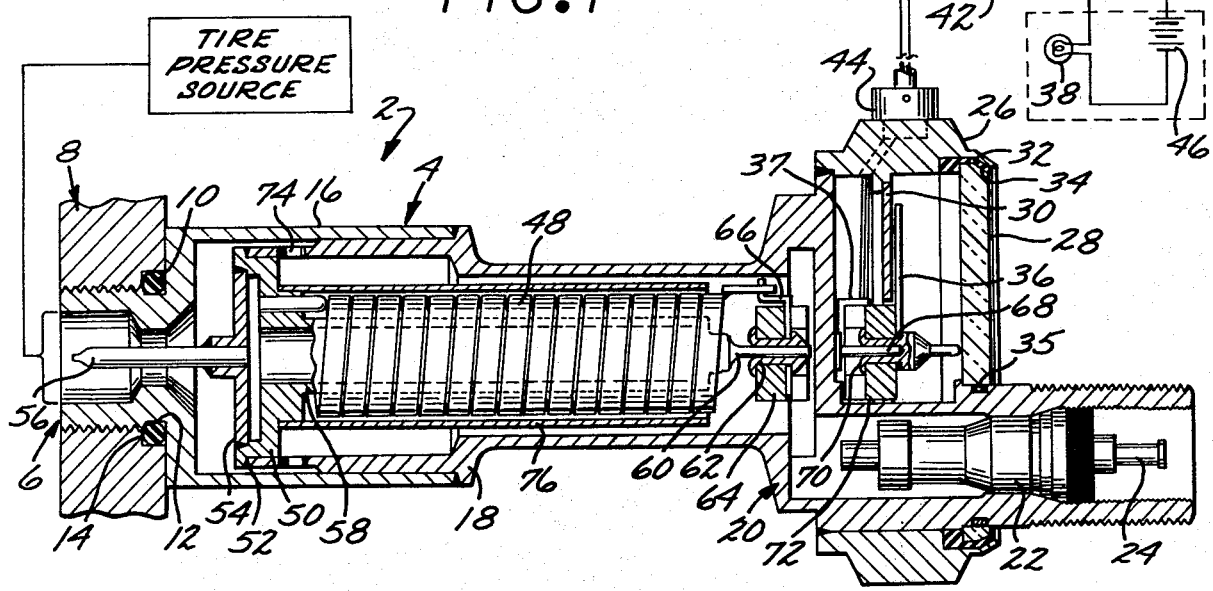
FIG. 1 is a cross-sectional view of a combination pressure indicator and valve assembly for aircraft tires.
Figure 4:
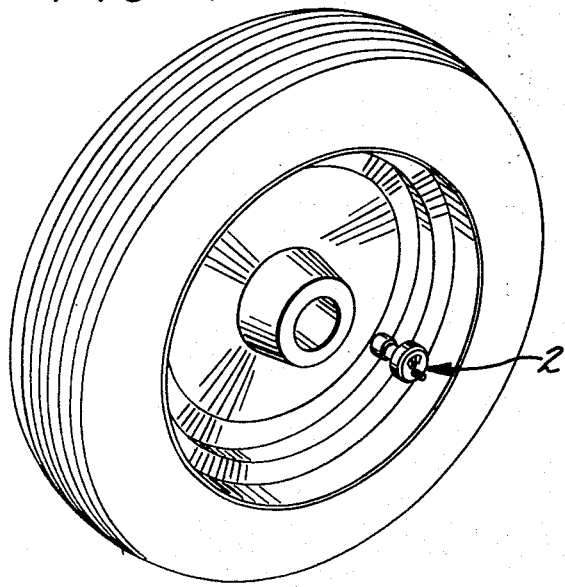
FIG. 4 is a perspective view of an aircraft tire having the pressure indicator and valve assembly of the present invention.

Referring to FIGS. 1 and 4, a combination pressure indicator and valve assembly 2 for aircraft tires is provided. As can be seen in FIG. 4, the condition of the tire pressure can be readily determined by visual inspection. Thus, the ground crew can quickly determine the operability of the tire. The assembly 2 includes an outer housing 4 having a threaded stem member 6 at one end. The threaded stem member 6 can be screwed into a complimentary threaded female bore within an aircraft tire wheel mounting member 8 as shown in FIGS. 1 and 4. Supplementing the threaded stem member 6 is an O-ring seal 10 mounted within an annular groove 12 at the base of the threaded stem member 6. An annular shoulder 14 can be provided on the wheel mounting member 8 to directly engage the O-ring seal 10.

Extending outward from the threaded stem member 6 is a cylindrical lower housing member 16. A cylindrical upper housing member 18 extends into and is welded onto the lower housing member 16 to provide the outer housing for the assembly 2.

Positioned at the other end of the cylindrical upper housing member 18, a valve housing body 20 is adapted to receive a conventional valve stem 22 used in the aircraft industry. Since the valve stem member 22 performs in a conventional manner, that is, it permits fluidic access to the interior of the aircraft tire when an actuator pin 24 is depressed, it is not necessary to describe each of the functioning component parts since they are well-known in both the aircraft industry and the tire industry and the specific component parts are not a feature of the present invention.

Adjacent to the valve housing body 20 is an indicator gauge housing 26 having a crystal face plate 28 and an indicia gauge back plate 30. Reference is made FIG. 3 and to FIG. 4 for an illustrative gauge back plate 30. Since the gauge assembly 2 is designed to provide a clear indication of an operative or nonoperative condition for the aircraft tire, the indicia gauge back plate 30 can be marked to simply indicate a go or no-go condition. Supplementing these two values will be a third indicia condition indicating a defective gauge.

The crystal faceplate 28 can be mounted within the gauge housing 26 by a gasket 32 which is in turn mounted in an annular gauge housing groove 34. A pointer member 36 can provide a visual indication, in conjunction with the gauge back plate 30, of the pressure condition within the aircraft tire. A valve gasket 35 acts as an environmental seal about the valve body 20.

Supplementing the pointer 36 and/or replacing the back plate 30 is a remote signal device such as a visual and/or audible indicator (not shown). Thus, a lamp 70 may be mounted in the cockpit of the aircraft to indicate the pressure condition of the tires. Appropriate lead wires 40 and 42 can be connected through a slip ring (not shown) to the lamp circuit and to a plug 44 mounted on the exterior of the gauge housing 26. The circuit may be powered by any source of voltage such as a battery 46 or any common D.C. or A.C. source. The pointer assembly, itself can establish electrical contact by closing the circuit through a contact pin 37 to activate the lamp 38. Alternatively, other transducer members can be utilized such as an optical pickup (not shown).

The sensor means for sensing a pressure differential in the preferred embodiments is a helical coil bourdon tube 48 capable of providing a 360° deflection with a pressure differential of 300 psi. The deflection will be of linear increments, that is a direct linear correlation exists between deflection and pressure. Helical coil bourdon tubes capable of meeting this requirement have been sold in gauges manufactured by HTL Industries, Inc. of Pasadena, Calif. such as their pressure gauge Model No. 181 series.

Referring to FIG. 1, the bourdon tube 48 is mounted onto a circular base member 50. The helical coil bourdon tube 48 is brazed onto the circular base member 50 to provide a hermetic seal. The rim 52 of the base member 50 is welded onto a portion of the cylindrical upper housing member 18 that extends within the cylindrical lower housing member 16. A closure plate 54 is welded onto the base member 50 and has a capillary tube 56 mounted at its center and brazed to insure a hermetical seal. Appropriate pressurizing fluid can be inserted into the cavity formed between the base member 50 and the closure plate 54 through the capillary tube 56. The capillary tube 56 can be closed or sealed by any appropriate methods such as crimping and welding. Frequently the pressure indicator itself will be calibrated by monitoring the pressure of the fluid applied to the capillary tube 56.

The cylindrical base member 50 further includes a cantilevered secondary reference chamber 58 that extends through the helical coils of the bourdon tube 48. This secondary reference chamber 58 is preferably made out of a material such as Inconel so that even during rapid temperature changes, the relatively high thermal conductivity characteristic will insure that the temperature of the fluid in the secondary reference chamber 58 will be of the same temperature as that of the monitored fluid. At the top of the secondary reference chamber 58 is a mounting post 60 that receives a bearing member 62. The bearing member 62, in turn, captures a magnetic ring 64 that can be made from a material such as Alnico-8. Finally, a connector member 66 is captured by the bearing member 62 and is further connected to one end of the helical coil bourdon tube 48. Thus, the connector member 66 will rotate with the helical coil bourdon tube 48 and, in turn, rotate the magnetic ring 64.

A second mounting post 68 on the exterior of the upper housing 18 is mounted on the same longitudinal axis as the first mounting post 60 and also carries a second bearing member 70. The second bearing member, in turn, mounts a second magnetic ring 72 and captures the pointer 36. As can be readily appreciated, as the first magnet ring 64 rotates to track the movement of the helical coil bourdon tube 48, the second magnetic ring 72 will likewise correspondingly rotate to position the pointer 36 so that it also tracks the movement of the helical coil bourdon tube 48. Thus, the relative rotational movement of the helical coil bourdon tube 48 resulting from any difference in pressure differential between its internal and external surfaces will be directly recorded by the pointer 36 and/or any remote control indicator such as the lamp 38. As a result of this magnetically induced movement, it is possible to hermetically seal the helical coil bourdon tube 48 from the exterior of the gauge housing while still permitting a sensitive calibrated movement of the pointer 36 to record the displacement of the helical coil movement.

The capability of isolating the helical coil bourdon tube 48 from the exterior gauge readout is important since the helical coil bourdon tube 48 is directly used as the sensing means for determining any pressure differential. Thus, the physical exterior surface is in direct pressure contact with either a secondary reference pressure or the monitored pressure while the interior of the helical coil bourdon tube 48 is also in direct pressure contact with the other pressurized fluid. The differential pressure between the interior and exterior surfaces of the bourdon tube provides a linear displacement that is directly representative of that pressure differential.

In the embodiment of FIG. 1, it can be readily seen that the monitored pressure within the aircraft tire, which is generally an inert fluid such as nitrogen, is directly applied through a plurality of ports 74 to the exterior of the helical coil bourdon tube 48. As can be readily appreciated, the valve housing body 20 can permit the release or addition of pressurized nitrogen into the tire. The secondary reference chamber can be charged with a fluid having a similar temperature pressure characteristic such as nitrogen.

If the gauge assembly becomes defective as a result of a leak in the helical coil bourdon tube 48 or the secondary reference chamber 58, the pointer 36 is calibrated to indicate a defective gauge. Thus a fail safe feature is provided in the present invention. Also, it should be noted that even if the gauge assembly fails, it will not release any of the primary pressure fluid since it is effectively sealed from the exterior. Thus, the pressure gauge assembly does not add an additional component that could fail and permit the tire to be deflated. This is very important with respect to assuring a high reliability of supplied equipment in the safety conscious aircraft industry.

The tire is made of basically a resilient material such as rubber and/or resilient synthetics and it has been found that the modulus of elasticity of the tire material used for aircraft tires is temperature sensitive and thus the relative elasticity of the tire body or primary monitored pressure vessel is susceptible to volumetric changes. Thus, the gauge assembly 2 of the present invention when used on aircraft tires must not only be temperature compensated but also must be designed to accommodate volumetric changes in the primary reference chamber. If means were not provided for compensating for the volumetric changes in the tire volume during normal operation, then a false signal could be generated indicating a leak when actually the tire volume has simply increased due to temperature. The means for compensating for the volumetric changes includes an adjustment in the amount of the secondary source of pressure so that it will be pressure charged approximately five to ten percent less than the normal pressure charge of the tire at atmospheric pressure and 68° F.

Accordingly, the secondary reference pressure can be set at five to ten percent less than the normal charging of the tire pressure, for example, a DC-10 tire is pressurized to 170 to 185 psi at atmospheric pressure and 68° F. and the secondary pressure would be approximately 165 psi. As a result of undercharging the secondary reference chamber and appropriately calibrating the relative position of the pointer 36 and the back dial, it is possible to compensate for a volumetric variance of up to ten percent without the gauge indicating a leak. Thus, if the temperature increases but the primary reference pressure does not correspondingly increase the same amount as the secondary reference chamber because of the expansion of the walls of the aircraft tire, it is still possible to have a positive pressure differential between the interior and the exterior of the housing chamber (that is the exterior pressure being greater than the interior pressure) to maintain the pointer 36 in a green or go condition.

As can be appreciated the pressure gauge assembly 2 can be subjected to vibration and accordingly, a nylon or teflon hollow cylindrical sleeve 76 can be optionally mounted about the helical coil bourdon tube 48 to dampen vibration.

Figure 2:
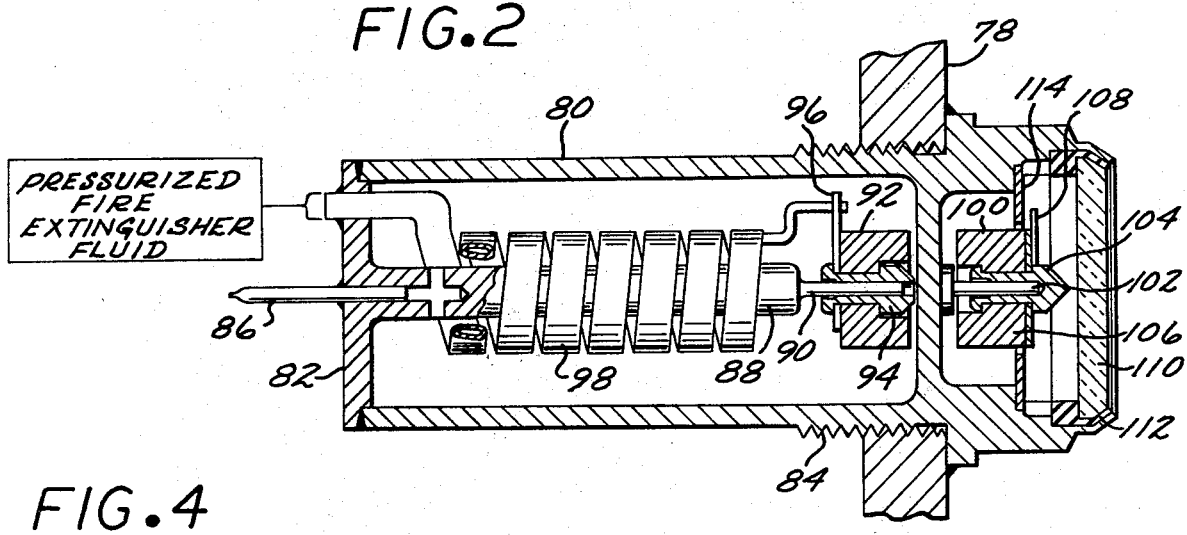
FIG. 2 is a cross-sectional view of an alternative embodiment of the present invention for use with a fire extinguisher assembly.

Referring to FIG. 2, a variation of the present invention is disclosed for use in the environment of a fire extinguisher container. Generally, a fire extinguisher can embody an elliptical, spherical or cylindrical metal housing and is frequently four to twenty inches in diameter and of any length. The fire extinguisher tank 78 can be mounted alone or in series adjacent an aircraft engine. Usually, it will be spherical and subject to relatively high pressures. It should be understood that this particular embodiment of the present invention need not be limited to the environment of fire extinguishers but is rather described in this environment as one practical application of the present invention that meets the specific needs of the aircraft industry. Exemplary of other applications are impact and floatation pressure containers that can experience pressures of 10,000 psia or greater and sudden temperature changes of several hundred degrees Fahrenheit. The tank 78 may contain a quantity of fire extinguishing fluid, such as Freon 1301, and a quantity of nitrogen gas as a pressurizing fluid. Frequently, a tracer gas such as helium will be added to the tank 78. A secondary chamber reservoir housing 80 is closed at one end by a cap member 82 that is welded thereto. Exterior threads 84 on the housing 80 are complimentary to a threaded bore within the tank 78. The housing 80 can be welded to the tank 78 to insure a hermetical seal. Alternatively an O-ring seal (not shown) could be used on certain applications. The cap member 82 and the reservoir housing 80 are appropriately welded or braised together and can be made from material such as stainless steel or beryllium copper.

The use of a material such as beryllium copper is important, particularly in applications that are subject to rapid temperature changes, since it has a relatively high thermal conductivity characteristic. Thus, any fluid within the reservoir housing 80 will experience the same temperature range as the exterior pressurized fluid without any appreciable temperature lag, even during a relatively high temperature rate of change. The cap member 82 contains a centrally located bore that is adapted to acommodate a capillary tube 86. The capillary tube 86 can be closed or sealed by any appropriate method such as crimping and welding. Frequently, the gauge assembly will be calibrated by monitoring the pressure of the fluid applied to the capillary tube 12. The cap member 82 has an elongated stem 88 that terminates in a mounting post 90. Attached to the mounting post 90 is a magnetic ring 92 that is captured by a bearing member 94. A connector 96 is connected to one end of a helical coil bourdon tube 98.

Figure 3:
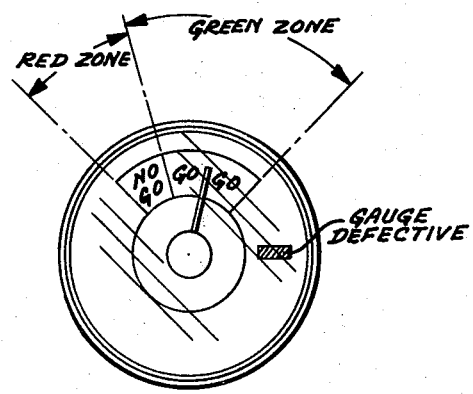
FIG. 3 is a plan view of an indicator dial face.

Mounted within a concave cavity 100 is a second mounting post 102 that is on the same longitudinal axis as the first mounting post 90. Again, a second bearing member 104 captures a second magnetic ring 106 and also a pointer 108. A crystal 110 is mounted within a gasket 112 to protect the pointer 108 and an indicia dial plate 114 in the same manner as shown in FIG. 3.

The magnetic output indicator means operates in a similar fashion as that described with respect to the first embodiment shown in FIG. 1. The difference in this embodiment is that the helical coil bourdon tube 98 has its interior directly connected to the fire extinguisher fluid. The secondary reference chamber in the embodiment of FIG. 2 is in fluidic contact with the exterior of the helical coil bourdon tube 98.

The helical coil bourdon tube 98 will linearly deflect in response to any pressure differentials between the secondary source of pressure within the housing 80 and the primary reference source which is the pressurized fire extinguishing fluid. Thus, if there are any sources of leakage, for example, due to microscopic openings in the metal from which the container is made, flaws in the welding material which are not readily detectable, fatigue of the material of the container because of the stresses and strains and numerous other factors, it will be readily disclosed by the exterior red dial zone without adding any additional sources of leakage by incorporating the present pressure indicator.

Since both the primary and secondary chambers will be subjected to approximately the same ambient temperatures, particularly with the use of high thermal conductivity material for the housing 80, the relative pressures will be approximately the same. For example, a container filled with substantially identical fluid components, namely, Freon 1301 and nitrogen gas of the same general proportions, at a pressure of 600 psi at 68° F. could drop to approximately 180 psi at a minus 65° F. when used adjacent an aircraft engine. In that event the helical coil bourdon tube 98 will remain essentially undefected and the output dial or any remote indicator that could be connected to the output dial to indicate the condition of a fire extinguisher fluid in the cockpit will also remain inactive indicating that no leakage has occurred in the fire extinguisher fluid.

In operation, the secondary chamber reference housing 80 is filled with a reference fluid which is frequently of the same or substantially identical fluid components as that of the primary fire extinguishing tank 78. When the pressure in the primary chamber is lost, for example, due to leakage, the helical coil bourdon tube 98 will be deflected due to the relative pressure differential between the interior and exterior surfaces of the coils. The bearing member 94 and its attached magnetic ring 92 will likewise move a corresponding distance representative of accumulative movement of the helical coils. This movement will, in turn, be detected as a variance in the magnetic field with a corresponding movement of the pointer magnet ring 106 to register the pressure differential by the relative position of the pointer 108 and the dial plate 114.

With the present invention, the fire extinguisher containers on a modern jet airliner can be conveniently checked from the ground by a ground crew by simply a visual observation through a port to determine if the gauge is registering a go or no-go condition. Again, a fail safe arrangement of the gauge pointer and dial face can indicate whether the gauge is operative. Also the fail safe arrangement of the present gauge further assures that even if the gauge does fail it will not result in a loss of fire extinguisher fluid.

Various modifications of the present invention are possible as can be readily appreciated by a person skilled in these fields. For example, the present invention can be used in many different applications, such as but not limited to hydraulic systems, inflation systems for aircraft emergency slide rafts and floatation systems for military aircraft. Accordingly, the present invention should be measured solely from the following claims wherein I claim:

What is claimed is:

1. A combination pressure indicator and valve assembly for aircraft tires comprising;
    means for attachment of the assembly to a wheel mounting member;
    sensor means for sensing a pressure differential in fluidic contact with the pressurized fluid in the tire;
    a secondary source of pressure operatively connected to the sensor means having substantially the same pressure temperature response characteristic as the fluid in the tire;
    indicator output means responsive to the sensor means for providing an output representation of a predetermined pressure differential between the secondary source of pressure and the tire pressure,
    valve means for providing fluidic access to the interior of the tire, and
    means for compensating for volumetric changes in the tire volume during normal operation.

2. The invention of claim 1 wherein the means for compensating for volumetric changes in the tire volume include providing a secondary source of pressure which is undercharged approximately five to ten percent below the pressure charge in the tire at approximately atmospheric pressure and 68° F.

3. The invention of claim 1 wherein the sensor means is a helical bourdon tube and the means for compensating for volumetric changes in the tire volume connecting the secondary source of pressure to the interior of the bourdon tube and providing a secondary source of pressure which is undercharged approximately five to ten percent below the pressure charge in the tire at approximately atmospheric pressure and 68° F.

4. The invention of claim 3 further including a secondary reference chamber connected to the bourdon tube.

5. The invention of claim 4 wherein the secondary reference chamber is mounted within the helical bourdon tube.

6. The invention of claim 4 further including an enlarged base member on the secondary reference chamber and a capillary tube mounted to the base member.

7. The invention of claim 1 wherein the means for attachment includes a housing assembly and the indicator output means includes a first magnet operatively mounted to the sensor means and mounted within the housing assembly and a second magnet mounted externally of the housing assembly and responsive to the position of the first magnet.

8. The invention of claim 7 further including a dial housing and a dial pointer wherein the second magnet is mounted within the dial housing and is connected to the dial pointer.

9. The invention of claim 7 further including an elongated secondary reference chamber connected to the sensor means and operatively mounted the first magnet member for movement with the sensor means.

10. The invention of claim 1 further including an antivibration sleeve mounted about the sensor means.

11. The invention of claim 1 further including a remote output indicator responsive to the output representation.

12. The invention of claim 1 wherein the means for compensating for volumetric changes in the tire volume during normal operation includes providing a secondary source of pressure which has a differential pressure charge of approximately five to ten percent different than the operational pressure charge in the tire.

13. The invention of claim 1 wherein the means for compensating for volumetric changes in the tire volume include providing a different pressure charge value in the secondary source of pressure relative to the operational pressure charge in the tire.

14. The invention of claim 1 wherein the indicator output means further includes means for indicating a defective gauge.

15. A pressure indicator gauge for an aircraft tire comprising;
means for attachment of the gauge to the tire;
sensor means for sensing a pressure differential in fluidic contact with the pressurized fluid in the tire;
means for compensating for volumetric changes in the tire volume during normal operation including a secondary source of pressure operatively connected to the sensor means and having a predetermined pressure relative to the tire pressure to compensate for any volumetric changes in the tire during operation, and
indicator output means responsive to the sensor means for providing an output representation of any pressure differential between the secondary source of pressure and the tire that would indicate an underinflated tire.

16. The invention of claim 15 wherein the means for compensating for volumetric changes includes a secondary source of pressure that is approximately undercharged by five to ten percent as compared to the normal pressure in the tire at approximately 14.7 psia and 68° F.

17. A pressure indicator gauge comprising;
means for attachment of the gauge to a first source pressure to be monitored;
a bourdon tube sensing element for sending a pressure differential in fluidic contact with the pressurized fluid in the first pressure source;
a secondary source of pressure also operatively in fluidic contact with the bourdon tube sensing element whereby both the interior and exterior surfaces of the bourdon tube sensing element are subject to pressure above atmospheric, wherein the secondary source of pressure is pressure charged approximately five to ten percent less than the pressure charge of the first source pressure at atmospheric pressure and 68° F., and
means for indicating any movement of the bourdon tube sensing element in response to a pressure differential between its interior and exterior surfaces.

18. The invention of claim 17 wherein the secondary source of pressure is connected to the interior of the bourdon tube sensing element.

19. A temperature compensated pressure indicator for determining any fluidic leaks from a pressurized storage container of fluid comprising;
means for attachment of the pressure indicator to the storage container;
bourdon coil sensor means for sensing a pressure differential in fluidic contact with the storage container;
a secondary source of pressure operatively connected to the same bourdon coil sensor means having substantially the same pressure temperature response characteristics as the fluid in the storage container;
a magnetic force field generating member operatively connected to the response of the sensor means,
indicator output means responsive to the magnetic force field generating member for providing an output representation of any pressure differential between the secondary source of pressure and the storage container and
means for compensating for volumetric changes in the storage container volume including connecting the secondary source of pressure to the interior of the bourdon coil, the secondary source of pressure being undercharged approximately five to ten percent below the pressure charge in the storage container at approximately 14.7 psia and 68° F.

20. The invention of claim 19 wherein the means for attachment includes a housing assembly and the indicator output means includes a first magnet operatively mounted to the sensor means and mounted within the housing assembly and a second magnet mounted externally of the housing assembly and responsive to the position of the first magnet.

21. The invention of claim 20 further including a dial housing and a dial pointer wherein the second magnet is mounted within the dial housing and is connected to the dial pointer.

22. The invention of claim 19 further including an antivibration sleeve mounted about the bourdon coil sensor means.

23. The invention of claim 19 further including a remote output indicator responsive to the output representation.

24. A hermetically sealed pressure indicator gauge comprising;
means for attachment of the gauge to a first source pressure to be monitored;
a bourdon tube sensing element for sensing a pressure differential in fluidic contact with the pressurized fluid in the first pressure source;
a secondary source of pressure also operatively in fluidic contact with the bourdon tube sensing element whereby both the interior and exterior surfaces of the bourdon tube sensing element are subject to pressure above atmospheric;
means for hermetically sealing the bourdon tube sensing element and secondary source of pressure to prevent any loss of the first source of pressure if either one of the bourdon tube sensing element and secondary source of pressure develops a leak, and
means for indicating any movement of the bourdon tube sensing element in response to a pressure differential between its interior and exterior surfaces further including means for indicating a defective gauge.

25. The invention of claim 24 wherein the secondary source of pressure is pressure charged approximately five to ten percent less than the pressure charge of the first source pressure at atmospheric pressure and 68° F.

26. The invention of claim 24 wherein the secondary source of pressure is connected to the interior of the bourdon tube sensing element.

27. A combination pressure indicator and valve assembly for aircraft tires comprising;
- means for attachment of the assembly to a wheel mounting member including a housing assembly;
- sensor means for sensing a pressure differential in fluidic contact with the pressurized fluid in the tire;
- a secondary source of pressure operatively connected to the sensor means having substantially the same pressure temperature response characteristic as the fluid in the tire;
- indicator output means responsive to the sensor means for providing an output representation of a predetermined pressure differential between the secondary source of pressure and the tire pressure, the indicator output means includes a first magnet operatively mounted to the sensor means and mounted within the housing assembly and a second magnet mounted externally of the housing assembly and responsive to the position of the first magnet, and
- valve means for providing fluidic access to the interior of the tire.

28. The invention of claim 27 further including a dial housing and a dial pointer wherein the second magnet is mounted within the dial housing and is connected to the dial pointer.

29. The invention of claim 27 further including an elongated secondary reference chamber connected to the sensor means and operatively mounting the first magnet member for movement with the sensor means.

30. A hermetically sealed pressure indicator gauge comprising;
- means for attachment of the gauge to a first source pressure to be monitored;
- a bourdon tube sensing element for sensing a pressure differential in fluidic contact with the pressurized fluid in the first pressure source;
- a secondary source of pressure also operatively in fluidic contact with the bourdon tube sensing element whereby both the interior and exterior surfaces of the bourdon tube sensing element are subject to pressure above atmospheric, the secondary source of pressure is pressure charged approximately five to ten percent less than the pressure charge of the first source pressure at atmospheric pressure and 68° F;
- means for hermetically sealing the bourdon tube sensing element and secondary source of pressure to prevent any loss of the first source of pressure if either one of the bourdon tube sensing element and secondary source of pressure develops a leak, and
- means for indicating any movement of the bourdon tube sensing element in response to a pressure differential between its interior and exterior surfaces.

* * * * *